April 30, 1929.  C. HEDDON  1,711,200

FISH BAIT

Filed May 6, 1926

Inventor:
Charles Heddon,

Patented Apr. 30, 1929.

1,711,200

UNITED STATES PATENT OFFICE.

CHARLES HEDDON, OF DOWAGIAC, MICHIGAN, ASSIGNOR TO JAMES HEDDON'S SONS, OF DOWAGIAC, MICHIGAN, A CORPORATION OF MICHIGAN.

FISH BAIT.

Application filed May 6, 1926. Serial No. 107,025.

The bait of the present invention is designed to simulate the appearance of a natural frog, and at the same time to combine certain features of construction which have heretofore been applied solely to wooden minnow baits of the character largely in use at the present time for the luring of fresh water game fishes.

One of the principal advantages of the wooden minnow is its buoyancy, which causes it to rise to the surface when not being retrieved, and, at the same time, the wooden construction is one adapted to be configured in such a way as to impart to the bait the diving and darting movements which tend to attract the attention of game fishes.

Heretofore, so far as I am aware, frog baits have been constructed solely of rubber or composition of a weight or mass which caused them to sink when resting in the water, and have not been designed to cause any diving or darting movements when being retrieved through the water.

The present bait is intended to combine the buoyancy and head features of the wooden minnow, with the leg and body formation of a frog, and with the center of weight so disposed that when the bait is at rest, the rear portion of the body and legs will hang downwardly in the water, which is the characteristic position of a live frog at rest, but when the line is being retrieved will dive and dart after the manner of a live bait. These results are obtained by a combination wooden and rubber bait which permits the head portion to be configured of wood in such a way as to provide for the diving and darting of the bait when in motion, while the rear portion of the body and legs is molded of rubber or similar composition which affords the necessary toughness to provide for the division of the legs, and which also weights the rear end of the bait sufficiently to cause it to assume a frog-like position when the bait is at rest in the water. Furthermore, the divided legs serve to guard the hook against fouling.

The invention is directed to the combination of a wooden body and rubber leg portion, to the means for securing the hook or hooks, and to the details of construction which in conjunction afford a bait having numerous desirable features of construction and use.

Figure 1:
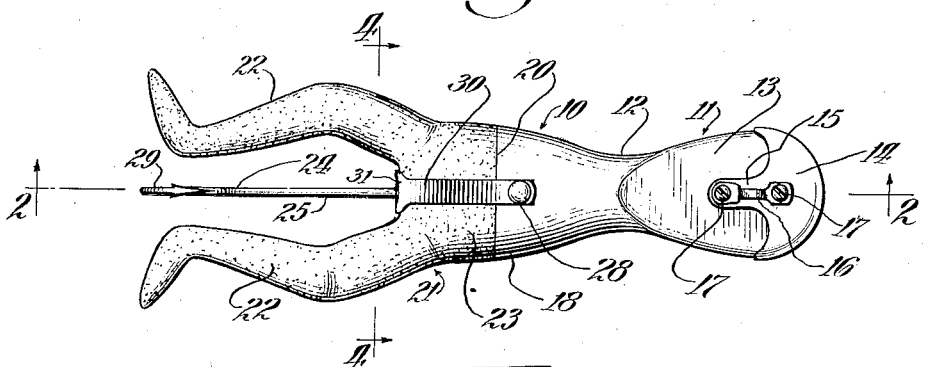
Figure 1 is a top view of the bait.
Figure 2:
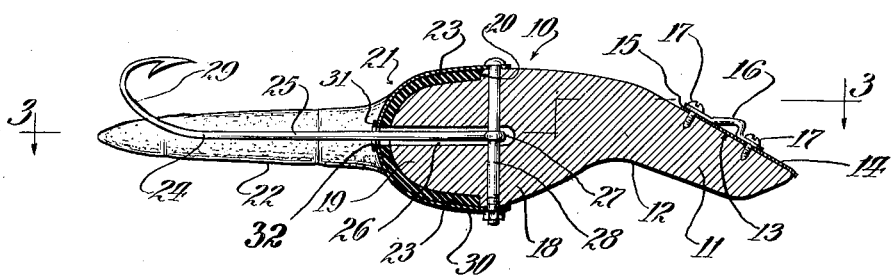
Fig. 2 is a vertical section taken on the line 2—2 of Fig. 1.
Figure 3:
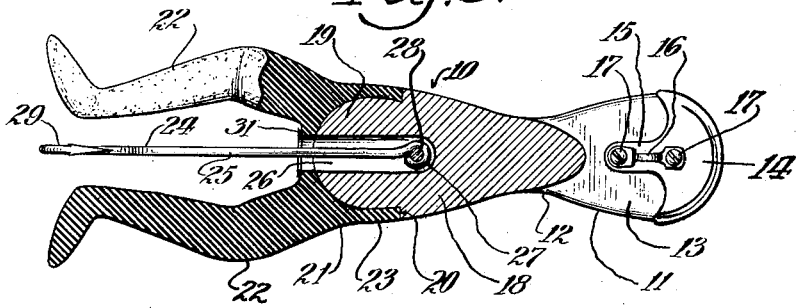
Fig. 3 is a longitudinal section taken on line 3—3 of Fig. 2.
Figure 4:
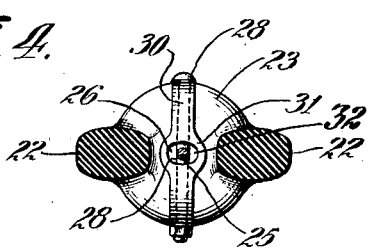
Fig. 4 is a cross sectional view taken on line 4—4 of Fig. 1.

The bait as a whole comprises a wooden body 10 terminating at its forward end in a head 11 united to the body by a neck 12 of reduced diameter. The body is of ovate formation tapering forwardly to the point of mergence into the neck, and the head is flared laterally and flattened on its upper face 13, which, when the bait is level, will present a forwardly and downwardly extending oblique surface for impingement against the water. The forward portion of the oblique face 13 is protected by a guard plate 14 of generally crescent formation having a rearwardly extending tongue 15 which serves as a base for the securement of a loop 16 which furnishes a line tie for the bait and is secured to the wooden head of the bait by screws 17 or the like.

The wooden body is downwardly protruded towards its middle or abdominal portion 18 and thence is given a hemi-spherical formation at its rear end 19. At the point of juncture of the abdominal and rear portions, the body is preferably offset to afford a circumferentially extending shoulder 20, and the rear portion of the body affords a mounting for the leg portion 21 of the bait which is preferably made of rubber or a rubber-like composition having elements of toughness and elasticity characteristic of rubber.

This portion of the bait is cast or molded and comprises a pair of legs 22 in spaced relation to one another, which legs merge into a body sheath or cap 23 which snugly surrounds the rear end of the wooden body and abuts at its forward end against the shoulder 20, so that the exterior of the bait will present a smooth and unbroken appearance at the point of mergence of the two sections together. The rubber portion is preferably cemented to the wooden portion, and the bait as a whole may be finished in any suitable way, by stripes, spots, or the like, in simulation of a natural frog.

It is preferred to provide the bait with a single hook 24, the shank 25 of which is entered into a bore 26 extending longitudinally through the center of the sheath or cap and through the rear portion of the wooden body to a point near the center of the bait body. The diameter of the bore is sufficient to permit the eye 27 of the hook to be inserted through the bore and afterwards anchored and held by the insertion of a vertically extending pin 28 which traverses the body of the bait and serves as a pivotal mounting for the forward end of the hook. This affords a slight degree of lateral pivotal movement to the rear end of the hook by reason of the clearance between the shank of the hook and the surrounding bore, but, at the same time, the arrangement maintains the hook in substantial alignment between the legs of the bait with the barbed portion of the hook 29 extending upwardly at a point near the feet of the legs, so that the hook will be guarded by the legs against weeds or other obstructions, and, at the same time, the arrangement is one which will not interfere with the striking of the hook by the fish.

In order to reinforce the rear end of the bait, a U-shaped metal saddle 30 is provided which embraces the rear portion of the bait through the crotch between the legs and is secured at its free ends by the cross pin 28. The saddle at its center 31 is laterally extended and provided with a transversely elongated slot 32 through which the shank of the hook extends and which serves, in conjunction with the walls of the bore, to limit the free movement of the hook. The saddle, furthermore, serves as a reinforcement for the rubber portion of the bait, and in conjunction with the cementing of this portion to the wooden portion, effectively serves to guard against any disruption of the bait at the joint.

The cross pin 28 is preferably made removable to permit of the substitution of hooks, and in lieu of the single hook shown, it is obvious that double hooks or other types of hook arrangements, commonly used in bait construction, may be substituted without departing from the principle of the invention.

The rubber leg portion of the bait is preferably made solid, in order to afford the necessary weight to sink the rear end of the bait when at rest in simulation of the resting position of a live frog which the bait closely resembles in coloration and general contour.

In use, the bait will have sufficient bulk and weight to facilitate casting, and when it strikes the water, the rear end will tend to settle downwardly to give the appearance of a resting frog standing in an almost vertical position in the water, but as soon as the bait is retrieved, the oblique formation of the head portion will afford an impinging action against the water, and the water pressure will be erratically relieved on opposite sides of the reduced neck which will occasion a side to side darting movement of the bait in conjunction with a dipping or diving movement which will serve to attract the fish.

The rear leg portion of the bait, being of a tough rubber or composition, will be proof against breakage, and at the same time, the use of rubber or composition permits these portions of the baits to be molded or cast and suitably configured in a way which would be expensive or impractical in the manufacture of a bait composed wholly of wood, which furthermore would be unsuited by reason of its grain and fragility to the formation of a spread or divided leg portion of the bait.

By combining a wooden body, which may be readily turned or configured by methods commonly in use in bait manufacture, in conjunction with a molded leg portion of rubber or the like, manufacturing difficulties are avoided and a bait is produced which will be sufficiently strong to withstand hard usage, and which, at the same time, by reason of the adherent character of the materials employed, will naturally assume a life-like position in the water when at rest, and will by its diving and darting movements simulate a live bait when being retrieved.

Furthermore, the disposition of the weight in the leg portion, which constitutes the heavier end of the bait, is favorable to casting in that this end of the bait will be the leading end in casting, and tend to carry out the line in an even and uniform manner, and will also cause the bait to strike the water leg end first in position to immediately begin retrieving the bait. At the same time, the arrangement is one which, during casting, holds the hook away from the line, so that there will be no danger of fouling the line on the hook.

Although the bait has been described with particular reference to one which simulates the appearance of a frog, nevertheless, the idea of employing buoyant and non-buoyant materials, joined together into a seemingly continuous body, and configured to present the appearance of a natural bait, is one which readily lends itself to the simulation of other bait forms, and unless specifically claimed, it is not the intention of limiting the present invention to a bait in simulation of a frog.

I claim:

1. In a fish bait, the combination of a wooden body and a leg portion secured to the rear end of the body and composed of a plastic composition configured to afford divided rearwardly extending legs, a hook having its shank entered between the legs and into the wooden body, and means for securing the forward end of the shank within the wooden body in such a way as to permit limited lateral movement to the free end of the hook, substantially as described.

2. In a fish bait, the combination of a buoyant body and a leg portion secured to the rear end of the body and composed of a plastic non-buoyant composition configured to afford divided rearwardly extending legs, a hook having its shank entered between the legs and into the buoyant body, and means for securing the forward end of the shank within the buoyant body in such a way as to permit limited lateral movement to the free end of the hook, substantially as described.

3. In a fish bait, the combination of a buoyant body and a leg portion secured to the rear end of the body and composed of rubber-like non-buoyant composition configured to afford divided rearwardly extending legs, a hook having its shank entered between the legs and into the buoyant body, and means for securing the forward end of the shank within the buoyant body in such a way as to permit limited lateral movement to the free end of the hook, substantially as described.

4. In a fish bait, the combination of a wooden body terminating at its forward end in an obliquely forwardly extending head joined to the body by a neck of reduced diameter, the forward upper face of the head extending obliquely downward, a leg portion of plastic material comprising a cap fitted over and secured to the rear end of the body, a pair of rearwardly extending separated legs, and a hook entered through the cap portion and into the body and having a shank extending rearwardly between the legs, substantially as described.

5. A fish bait comprising a wooden body merging at its forward end into a head joined to the body by a neck of reduced diameter, the forward upper portion of the head being flattened and obliquely disposed with respect to the body, a leg portion of rubber-like non-buoyant plastic material molded to afford a pair of separated rearwardly extending legs merging into a cap like portion fitted onto the rear end of the body, the body being provided with a longitudinal bore inwardly extending from its rear end and opening between the legs, and a hook having a shank of less diameter than the bore and having an eye at the forward end of the shank, said shank and eye being entered into the bore and having the barbed free end of the hook upturned above the legs, and a pin entered through the body and through the eye to pivot the hook in a manner to permit limited freedom of lateral swinging movement, substantially as described.

6. A fish bait comprising a wooden body merging at its forward end into a head joined to the body by a neck of reduced diameter, the forward upper portion of the head being flattened and obliquely disposed with respect to the body, a leg portion of rubber-like non-buoyant plastic material molded to afford a pair of separated rearwardly extending legs merging into a cap like portion fitted onto the rear end of the body, the body being provided with a longitudinal bore inwardly extending from its rear end and opening between the legs, and a hook having a shank of less diameter than the bore and having an eye at the forward end of the shank, said shank and eye being entered into the bore and having the barbed free end of the hook upturned above the legs, and a pin entered through the body and through the eye to pivot the hook in a manner to permit limited freedom of lateral swinging movement, and a U-shaped saddle embracing the cap and the rear portion of the body and having an opening in registry with the bore to afford passage for the shank of the hook and having the forward free ends of the saddle engaged by the pin, substantially as described.

7. In a fish bait, the combination of a buoyant body terminating at its forward end in an obliquely forwardly extending head joined to the body by a neck of reduced diameter, the forward upper face of the head extending obliquely downward, a pair of non-buoyant rearwardly extending separated frog-like legs of sufficient mass to cause the bait to hang obliquely downward when at rest, and a hook entered into the body and having a shank extending rearwardly between the legs, substantially as described.

8. A fish bait having a body, one end of which is configured from a buoyant material in simulation of the head and forward body portion of a natural bait, and the other end of which is configured from a non-buoyant material in simulation of the rear end portion of a natural bait the two ends merging unbrokenly into one another, and a line tie secured to the head portion of the bait, substantially as described.

9. A fish bait having a body the forward end of which is configured from a buoyant material and the rear end of which is configured from a non-buoyant material divided to simulate the legs of a frog, the two ends merging in flush relation to one another at the point of juncture to simulate a smoothly configured body and the non-buoyant end being of sufficient mass to cause the bait to hang obliquely when at rest, substantially as described.

10. A fish bait having a body the forward end of which is configured from a buoyant material and the rear end of which is configured from a non-buoyant material, the two ends merging in flush relation to one another at the point of juncture to simulate a smoothly configured body and the non-buoyant end being of sufficient mass to cause the bait to hang obliquely when at rest, substantially as described.

11. A fish bait having a body terminating at its forward end in a head, the forward portion of the body and head being configured of wood and the rear portion being divided to simulate the legs of a frog and being configured from a non-buoyant plastic material, the forward and rear portions merging in flush relation to one another at the point of juncture to simulate a smoothly configured body and the non-buoyant end being of sufficient mass to cause the bait to hang obliquely when at rest, substantially as described.

CHARLES HEDDON.